July 1, 1930.  C. E. LINEBARGER  1,768,915
HYDROMETER
Original Filed Jan. 5, 1921

INVENTOR:
Charles E. Linebarger
By EJAndrews
Atty.

Patented July 1, 1930

1,768,915

UNITED STATES PATENT OFFICE

CHARLES E. LINEBARGER, OF CHICAGO, ILLINOIS

HYDROMETER

Original application filed January 5, 1921, Serial No. 435,067. Divided and this application filed May 16, 1924. Serial No. 713,647.

This invention relates to improvements in hydrometers, including hydrometric units, and suitable apparatus to be used with such units in making hydrometric determinations.

This application is a division of my copending application Ser. No. 435,067, filed January 5, 1921, and reference may be had to that application for such details as are not material to the present application.

While any suitable hydrometric units may be used in carrying out my invention, I prefer for the purpose such units as I have described in my Patent No. 1,393,383, issued October 11, 1921.

I have also described in my Patent No. 1,424,730, issued August 1, 1922, one way of using these hydrometric units in order to indicate the density of a liquid, the units in such a case being confined in a hydrometric vessel into which has been forced a certain amount of the liquid to be tested, such as the electrolyte of a storage battery. In the hydrometric vessel are one or more units preferably several units, of slightly varying density; so that at a glance substantially the exact density of the liquid is indicated. For instance, if one of the units is substantially the same as the desired density of the liquid, a second unit slightly less dense, and a third unit slightly less dense than the second, it is obvious that when the second and third units float, and the first one is substantially suspended, that the liquid is at substantially the desired density; but if the first unit sinks the density of the liquid will be slightly below the desired density. If the second unit sinks the density will be lower, and if the third unit sinks the density will be still lower. A further characteristic of the units used in the same hydrometric vessel is that they are readily distinguished from each other by color or size, or otherwise. This, however, is not altogether essential as the position of the units in the liquid itself is ordinarily a sufficient indication.

My present invention, so far as the use of the units is concerned, differs from that set forth in said application, in that the units are confined in a perforated vessel which I call a cage, and the cage is permanently located in the battery which is to be tested so that it always contains some of the liquid to be tested. The cage may be made of any substance which is not injuriously affected by the liquid, and of any shape, provided only that it is open sufficiently to allow the liquid to be tested to freely pass in and out and not sufficiently to allow the units to escape.

Figure 1:
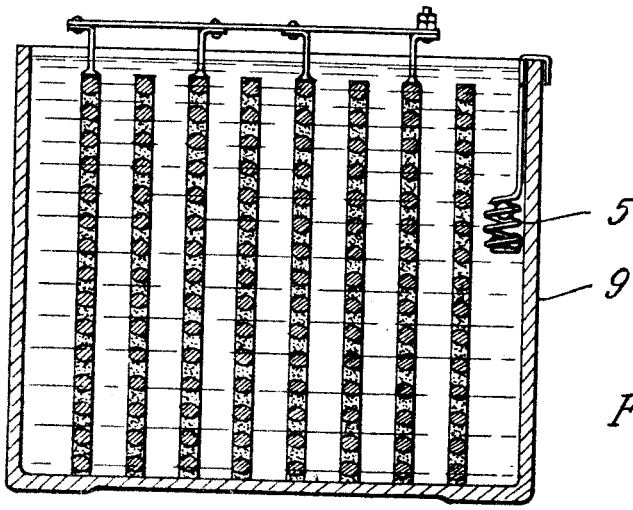
Figures 2, 3:
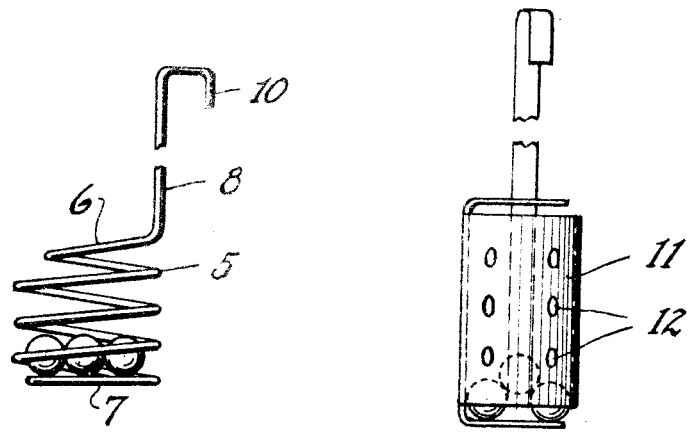

Of the accompanying drawings Fig. 1 is a view of a hydrometric device embodying the features of my invention and shown as used in indicating the density of a liquid in a cell; Fig. 2 is an enlarged view of the hydrometer device; and Fig. 3 is a modified form of the device.

Any suitable cage may be used, but I prefer the cage illustrated in Fig. 1 which consists of a coil of wire 5 flattened more or less so as to take up as little space as may be, and with the ends closed more or less by the portions 6 and 7 of the wire, and having a supporting portion 8 passing upwardly from the cage and arranged to be fastened in any suitable manner to the cell 9 so as to hold the cage permanently in its location. For this purpose I prefer to use a hook 10 hooked over the edge of the cell. A modified form of the cage which may be used is illustrated in Fig. 3, comprising a celluloid casing 11 having perforations 12, or otherwise open sufficiently to allow the liquid to pass freely through; and other modifications of the cage will be apparent to those skilled in the art. Preferably the cage is suspended entirely beneath the surface of the electrolyte in the container, so that the units are always entirely submerged. This prevents air bubbles forming on the surfaces of the units and affecting their buoyancies.

When the units are restrained in the cage permanently in one location and are in such a position as to be readily seen through the glass of the cell, or by removing the cover thereof, or in any other suitable way, it is necessary for the observer merely to glance at the cage in order to determine sufficiently the density of the liquid for ordinary purposes. By inserting in each of the cells of the battery one of these hydrometer cages, with suitable hydrometric units contained therein, the observer can quickly glance at all of the cells of the battery and determine whether or not the density condition of the electrolyte in each cell is proper, and take such steps as may be necessary. As many units as may be desired may be used, and they may be of any desired colors, shapes, or densities, due consideration being had to the density of the liquid to be indicated.

I claim as my invention:

1. The combination of a transparent liquid container, and a density indicator, said indicator comprising a perforated receptacle, means for supporting the receptacle in said container, and a hydrometric unit, restrained in said receptacle, the surface of said unit being materially softer than the inner surfaces of the receptacle.

2. The combination of a transparent liquid container, and a density indicator, said indicator comprising a perforated receptacle, a plurality of hydrometric units positioned entirely in said receptacle, and means fixed to said receptacle for suspending the receptacle on the wall of the container, the density of said units being unlike, the material of which the units are composed being softer than the material of which the receptacle is composed.

In testimony whereof, I hereunto set my hand.

CHARLES E. LINEBARGER.